UNITED STATES PATENT OFFICE.

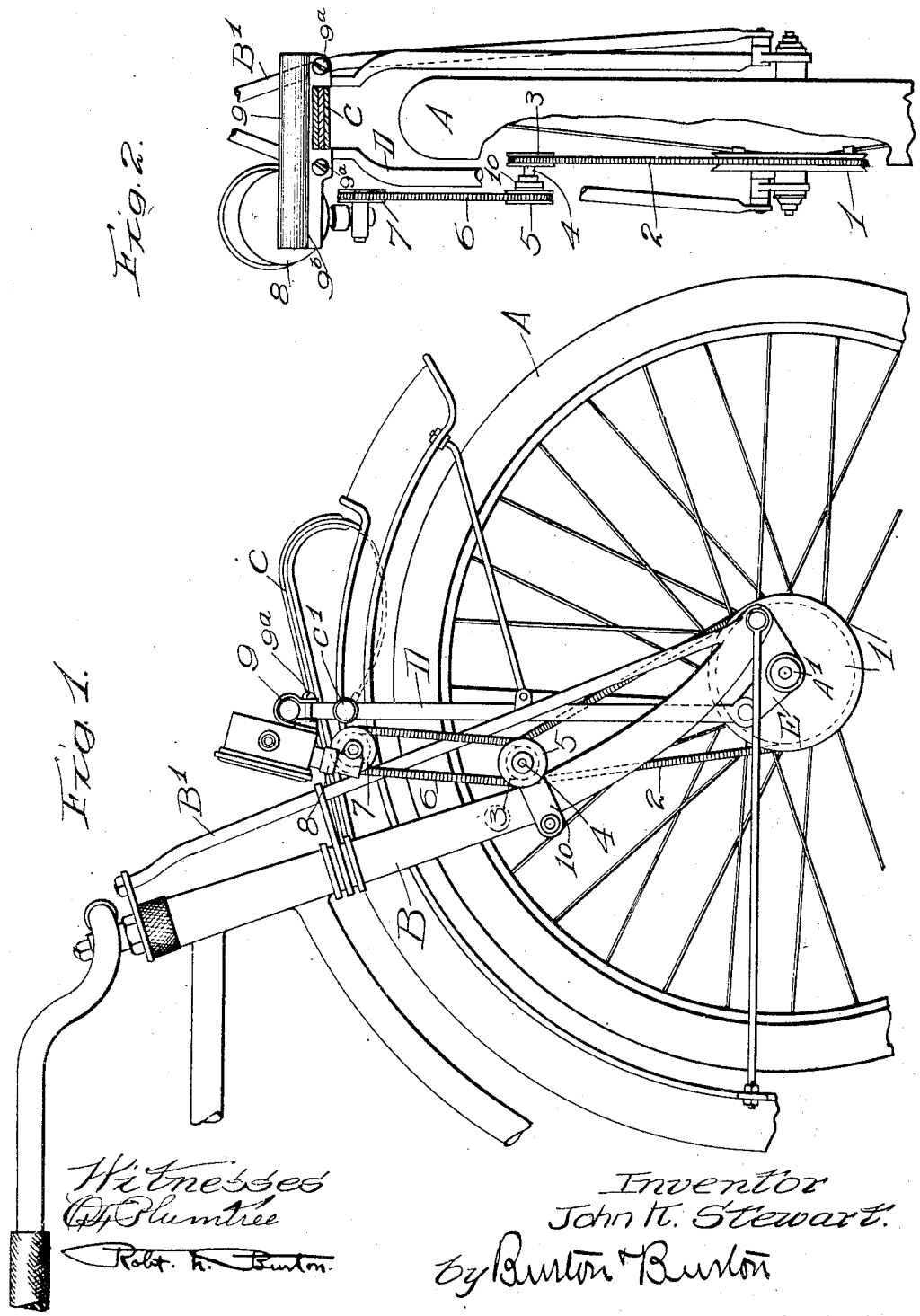

JOHN K. STEWART, OF CHICAGO, ILLINOIS, ASSIGNOR TO STEWART-WARNER SPEEDOMETER CORPORATION, OF VIRGINIA.

SPEEDOMETER DRIVING CONNECTION FOR MOTOR-CYCLES.

1,065,631. Specification of Letters Patent. Patented June 24, 1913.

Application filed September 14, 1912. Serial No. 720,312.

*To all whom it may concern:*

Be it known that I, JOHN K. STEWART, a citizen of the United States, residing at Chicago, in the county of Cook and State of Illinois, have invented new and useful Improvements in Speedometer Driving Connections for Motor-Cycles, of which the following is a specification, reference being had to the accompanying drawings, forming a part thereof.

The purpose of this invention is to provide an efficient and inexpensive drive connection for a speedometer when used on motorcycles.

It consists of the features and elements described and shown in the drawings as indicated in the claims.

In the drawings:—Figure 1 is a partial side elevation of the forward portion of a motorcycle having mounted upon it a speedometer and drive connections embodying this invention. Fig. 2 is a detail front elevation of certain parts shown in Fig. 1.

After extended experiment it has been found that the flexible shaft drive connection which is commonly employed with speedometers on automobiles is unsuitable and unsatisfactory in service on a motorcycle, particularly when the instrument is mounted substantially as shown in the drawings on the forward part of the frame and is driven from the front road wheel of the vehicle. With such an arrangement the vibration of the road wheel and of the frame due to roughness of the road, tends to set up a transverse vibration or "whipping" action in the flexible shaft used to connect the speedometer with the road wheel, and this vibration of the shaft causes rapid deterioration and liability to breakage within a short time. Furthermore, the cost of this type of drive is considered excessive in view of the total cost of the machine to which it is applied. To dispense with the flexible shaft, therefore, I have adopted a special form of belt drive which is not subject to the above described "whipping" action and which has the incidental advantage of comparative cheapness.

As illustrated in Fig. 1, the road wheel, A, of the motorcycle is provided with a grooved pulley, 1, over which a belt, 2, passes to a pulley, 3, on a short counter-shaft, 4. A second pulley, 5, secured rigidly to the counter-shaft, 4, is similarly provided with a belt, 6, passing over a pulley, 7, which is journaled on the speedometer, 8, and connected for rotating the mechanism thereof by any desired form of gearing not shown. In the particular form of motor-cycle here illustrated, the steering fork, B, of the frame does not carry the axle of the wheel, A, directly, but is provided with a leaf spring, C, which serves incidentally as a mud-guard, and to the free end of which there is connected at $C^1$, a secondary fork, D, which extends downwardly and is pivotally connected to the outer end of a short rocker arm, E, which is fulcrumed in the end of the fork, B, and which carries the axle of the wheel, A, intermediate its fulcrum and its pivotal connection to the fork, D, as indicated at $A^1$. The speedometer, 8, is mounted to move with the spring, C, being secured to the upper end of the fork, D, to which this spring, C, is connected by a bracket, 9, comprising a piece of sheet metal bent over said fork and clamped thereon by means of clamp screws, $9^a$, and having a laterally extending portion, $9^b$, to which the body of the speedometer may be affixed in any desired manner. But, since the bracket, 10, which carries the counter-shaft, 4, is clamped to the frame fork, B, it will be seen that both the pulley, 1, and the pulley, 7, will be subject to relative vertical movement with respect to the pulleys, 3 and 5, of the counter-shaft, 4, and to permit such movement the belts, 2 and 6, are made longitudinally elastic, being preferably composed of coiled spring wire arranged in a familiar manner. If a single belt were employed extending from the pulley, 1, to the pulley, 7, it would be subject in a measure to the same undesirable "whipping" action as is present in a flexible shaft, and this vibration would also tend to throw the belt off the pulleys and thus render it useless; but, by decreasing the lengths of unrestrained belting subject to vibration in the manner above indicated,—that is, by breaking up the belting into two shorter belts as shown, this difficulty is entirely overcome and transverse vibration of the belting becomes negligible. Obviously this single result might be accomplished merely by the use of idler pulleys positioned to be traversed by a single belt at a point about midway between the driving pulley, 1, and driven pulley, 7, but since by reason of the fixed dimensions of the motorcycle it is found necessary to locate the pulley, 1, partially within the bounding plane of the wheel tire, as indicated in Fig. 2, the transmission of the power outside of this plane is rendered quite simple by the employment of the counter-shaft, 4, together with the two belts, 2 and 6, in place of a single continuous piece of belting. Thus the speedometer pulley, 7, can be located laterally outside the frame fork, B, and the presence of the truss rod, B¹, of this fork does not interfere with transmission of the power from the inside to the outside of the fork.

I claim:—

1. In combination with a motorcycle having a road wheel, a frame supported thereon, comprising a fork straddling said road wheel and a speedometer mounted on the frame, means for driving said speedometer from said road wheel, comprising a pulley on the road wheel, a pulley journaled on the fork substantially in the plane of said road wheel pulley, a driving belt connecting said pulleys, and means operatively connecting said upper pulley with the speedometer extending laterally outside the fork of the frame.

2. In combination with a motorcycle having a road wheel, a frame supported thereon, comprising a fork straddling said road wheel, and a speedometer mounted on the frame, means for driving said speedometer from said road wheel, comprising a pulley on the speedometer, a pulley on the road wheel, a countershaft supported on the fork and carrying two pulleys, one of said pulleys being substantially in the plane of the road wheel pulley, and the other being positioned laterally outside the fork of the frame, and driving belts connecting said pulleys, respectively, with the road wheel pulley and the speedometer pulley.

In testimony whereof I have hereunto set my hand at Chicago, Illinois, this 11th day of September, 1912.

JOHN K. STEWART.

Witnesses:
 ROBT. H. BURTON,
 EDNA M. MACINTOSH.